United States Patent [19]

Davis et al.

[11] Patent Number: 4,661,531

[45] Date of Patent: Apr. 28, 1987

[54] PROCESS FOR PREPARING GRAFT POLYMER DISPERSIONS AND POLYURETHANES PREPARED THEREFROM

[75] Inventors: John E. Davis, Woodhaven; Duane A. Heyman, Monroe, both of Mich.

[73] Assignee: BASF Corporation, Wyandotte, Mich.

[21] Appl. No.: 703,505

[22] Filed: Apr. 10, 1985

Related U.S. Application Data

[63] Continuation-in-part of Ser. No. 591,946, Mar. 21, 1984, abandoned.

[51] Int. Cl.$^4$ .................. C08G 18/14; C08G 18/16; C08G 18/62

[52] U.S. Cl. .................. 521/137; 252/182; 524/377; 524/507; 524/710; 524/729; 524/732; 524/724; 524/750; 524/760; 524/762; 524/765; 525/127; 525/131; 528/75

[58] Field of Search .................. 528/75; 521/137; 252/182

[56] References Cited

U.S. PATENT DOCUMENTS

| | | | |
|---|---|---|---|
| Re. 28,715 | 2/1976 | Stamberger | 524/762 |
| Re. 29,014 | 10/1976 | Pizzini et al. | 524/762 |
| 3,275,606 | 9/1966 | Kujawa et al. | 528/298 |
| 3,280,077 | 10/1966 | Case et al. | 528/297 |
| 3,652,658 | 3/1972 | Fried et al. | 424/199 |
| 3,652,659 | 3/1972 | Kruger et al. | 560/242 |
| 3,875,258 | 4/1975 | Patton et al. | 526/75 |
| 3,950,317 | 4/1976 | Patton et al. | 525/130 |
| 3,953,393 | 4/1976 | Ramlow et al. | 260/31.8 R |
| 4,137,396 | 1/1979 | Louvar et al. | 544/398 |
| 4,140,667 | 2/1979 | Preston et al. | 260/33.2 R |
| 4,148,840 | 4/1979 | Shah | 260/859 R |
| 4,454,255 | 6/1984 | Ramlow et al. | 521/137 |

Primary Examiner—Herbert S. Cockeram
Attorney, Agent, or Firm—Norbert M. Lisicki

[57] ABSTRACT

Graft polymer dispersions in a polyol are prepared by a continuous process employing in situ free radical polymerization of an ethylenically unsaturated monomer in a polyol containing from about 0.001 to 0.09 mole of induced unsaturation per mole of polyol in the presence of an effective amount of a chain transfer agent. Products prepared by this process have uniform viscosity with resulting product uniformity. Polyurethane foams incorporating flame retardants prepared from these dispersions readily pass the California No. 117 Flame Test.

12 Claims, 1 Drawing Figure

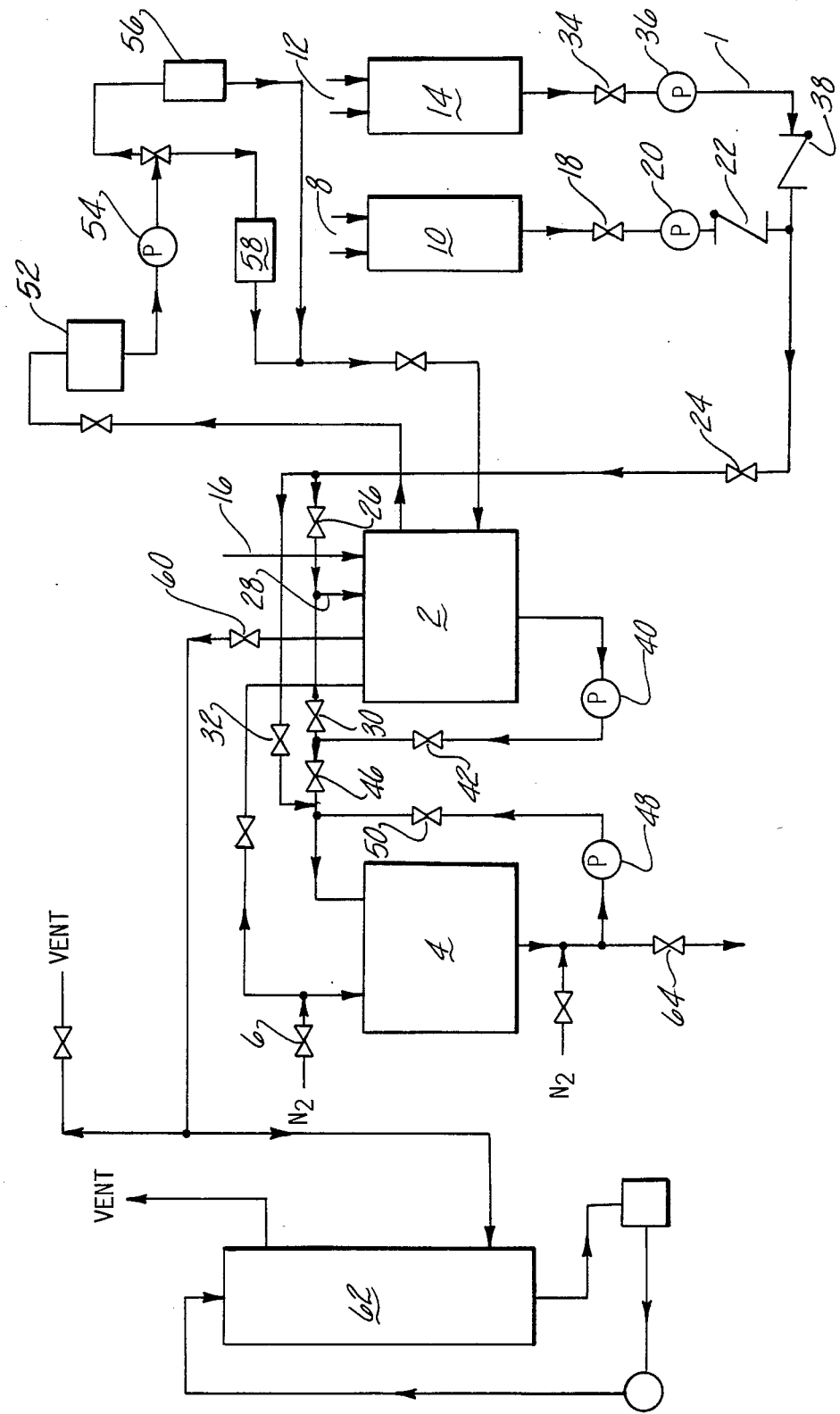

PROCESS FOR PREPARING GRAFT POLYMER DISPERSIONS AND POLYURETHANES PREPARED THEREFROM

This application is a continuation-in-part of Application Ser. No. 591,946 filed Mar. 21, 1984, now abandoned.

BACKGROUND OF THE INVENTION

1. Field of the Invention

The present invention relates to white stable graft polymer dispersions and polyurethanes prepared therefrom. More particularly, the invention relates to graft polymer dispersions prepared by the improved continuous process employing in situ free radical polymerization of an ethylenically unsaturated monomer or monomers in a polyol mixture containing from about 0.001 to 0.09 mole of induced unsaturation per mole of polyol mixture and further employing an effective amount of a chain transfer agent.

2. Description of the Prior Art

The prior art, as evidenced by U.S. Pat. Nos. 3,652,658; 3,875,258; 3,950,317, 4,137,396, and U.S. Re. Pat. Nos. 28,715 and 29,014 teach the preparation of graft polymer dispersions which are useful in the preparation of polyurethanes by the polymerization of ethylenically unsaturated monomers in the presence of polyols. The above patents disclose various methods of preparing graft polyol dispersions. U.S. Pat. No. 3,953,393 teaches the preparation of graft copolymer dispersions by employing alkylmercaptan chain transfer agents at concentrations from 0.1 to 2 percent by weight based on the weight of vinyl monomer. None of the prior art reveals an awareness of the desirability of conducting a continuous polymerization procedure to prepare graft polymer dispersions with uniform product viscosity employing unsaturation levels of from about 0.001 to 0.09 in the presence of a chain transfer agent. These products are employed to produce polyurethane foams having improved flame retardancy.

BRIEF DESCRIPTION OF THE DRAWING

The drawing illustrates a flow diagram of the graft polymer dispersion process.

DESCRIPTION OF THE PREFERRED EMBODIMENTS

In accordance with the improved continuous process for the preparation of a white stable graft polymer dispersion prepared by the in situ polymerization of an ethylenically unsaturated monomer or mixtures of monomers in the presence of a free radical initiator the improvement which comprises a polyol or polyol mixture containing from about 0.001 to 0.09 mole of induced unsaturation per mole of polyol or polyol mixture and, furthermore, the improvement comprising conducting the polymerization in the presence of an effective amount of a chain transfer agent. The polymerization may be carried out at temperatures between 25° C. and 180° C., preferably between 80° C. and 135° C. It has been discovered that wild fluctuations in product viscosities produced by a continuous process are eliminated when chain transfer agents are employed. These fluctuations occur especially at higher monomer concentrations. Thus, it has been found that small fluctuations in viscosity can occur at a total monomer content of 20 weight percent based on the total weight of the product whereas wild fluctuations in viscosity occur at monomer concentrations of about 40 weight percent or greater. The viscosity fluctuations affect product uniformity with resulting fluctuations in the physical properties of the polyurethane foams prepared from these graft polymer dispersions.

The improved process for the preparation can be described by reference to the attached drawing. In the drawing, reactor 2 and reactor 4 are purged with nitrogen 6 with the excess being vented with approximately a 1 psig of nitrogen pad remaining in the reactors. Polyol and initiator feed tank 10 is charged employing inlet 8 while monomer tank 14 is charged with monomer and chain transfer agent employing inlet 12. Reactor 2 is partially charged with some preformed graft polymer dispersion in polyol through inlet 16. Polyol and initiator are then fed through valve 18 employing pump 20 valve gate 22 and valve 24 through valve 26 at inlet 28. Simultaneously, monomer is fed through valve 34, pump 36, valve gate 38 through valves 24 and 26 at inlet 28. Upon reaching a predetermined volume of graft polyol dispersion in reactor 2, valves 42 and 46 are opened and employing pump 40, crude graft polymer dispersion is pumped into reactor 4. The flow of graft polymer dispersion into reactor 4 is adjusted to be equivalent to the amount of raw material being pumped into reactor 2. The material present in reactor 4 is then recycled employing pump 48 through valve 50. The temperature of reactor 2 is controlled by circulating a glycol 52 employing pump 54 through either heater 56 or cooling tank 58. During the process, excess nitrogen pressure which results from the decomposition of the initiator is vented through valve 60 and condenser 62 while maintaining a constant nitrogen pad on both reactors. The finished product upon being completed is discharged from reactor 4 through valve 64. The process is operated in a continuous manner.

The polyols which may be employed in the present invention are well known in the art. Both conventional polyols essentially free of ethylenic unsaturation such as those described in U.S. Re. Pat. No. 28,715 and unsaturated polyols such as those described in U.S. Pat. No. 3,652,659 and U.S. Re. Pat. No. 29,014 may be employed in the invention. Representative polyols essentially free from ethylenic unsaturation which may be employed in the present invention are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain 2 or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, equivalent weights of the polyols are from 30 to 10,000, preferably from 1000 to 3000.

Any suitable hydroxy-terminated polyester may be used such are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic acid, $\beta$-hydromuconic acid, $\alpha$-butyl-$\alpha$-ethyl-glutaric acid, $\alpha,\beta$-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, $\alpha$-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257-262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 30 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyi-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two -SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3-, 2,6-, 3,4-, 2,5-, 2,4-diaminotoluene; aliphatic amines such as methylamine, triisopropanolamine, ethylenediamine, 1,3-diaminopropane, 1,3-diaminobutane, and 1,4-diaminobutane.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

The unsaturated polyols which may be employed in the present invention may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene-3,4-epoxide, butadiene monoxide, vinyl glycidyl ether(1-vinyloxy-2,3-epoxy propane), glycidyl methacrylate and 3-allyloxypropylene oxide (allyl glycidyl ether). Also included but not limited, are the isocyanates such as vinyl isocyanate, the mono adduct of toluene diisocyanate and 2-hydroxylethylacrylate or methacrylate, amides such as the mono adduct of toluene diisocyanate and 2-aminoethylmethacrylate, and 2-isocyanatoethylmethacrylate. It is also contemplated that adducts of diphenylmethane diisocyanate instead of toluene diisocyanate may also be employed. If a polycarboxylic acid or anhydride is employed to incorporate unsaturation into the polyols, it is preferable to react the unsaturated polyol with an alkylene oxide, preferably ethylene or propylene oxide, to replace the carboxyl groups with hydroxyl groups prior to employment in the present invention. The amount of alkylene oxide employed is such as to reduce the acid number of the unsaturated polyol to about one or less.

The unsaturated polyols used in the present invention contain from about 0.001 mole to about 3.0 moles, preferably from about 0.001 mole to 0.09 mole of ethylenically unsaturation per mole of polyol. In the event that the unsaturated polyol contains more than about 0.09 mole of induced ethylenic unsaturation, the unsaturated polyol may be diluted with any conventional polyol which does not contain unsaturation. The preparation of the unsaturated polyols employed in the present invention follows conventional prior art procedurea such as are disclosed in U.S. Pat. Nos. 3,275,606, 3,280,077, and 4,454,255 or as disclosed in copending application Ser. No. 426,311, filed Sept. 29, 1982, now U.S. Pat. No. 4,550,194, the disclosures of which are hereby incorporated by reference. Preferred are the unsaturated polyols as disclosed in U.S. Pat. No. 4,454,255. Generally, this requires a reaction temperature between 50° C. and 180° C.

As mentioned above, the graft polymer dispersions of the invention are prepared by the in situ polymerization, in the above described polyols of an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, α-methylstyrene, 2-methylstyrene, 3-methylstyrene and 4-methylstyrene, 2,4-dimethylstyrene, ethylstyrene, isopropylstyrene, butylstyrene, phenylstyrene, cyclohexylstyrene, benzylstyrene, and the like; substituted styrenes such as cyanostyrene, nitrostyrene, N,N-dimethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methacrylic acid, methyl acrylate, 2-hydroxyethyl acrylate, methyl methacrylate, cyclohexyl methacrylate, benzyl methacrylate, isopropyl methacrylate, octyl methacrylate, methacrylonitrile, ethyl α-ethoxyacrylate, methyl α-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl butyrate, isopropenyl acetate, vinyl formate, vinyl acrylate, vinyl methacrylate, vinyl methoxyacetate, vinyl benzoate, vinyltoluene, vinylnaphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl methyl ketone, vinyl ethyl ketone, vinyl phenyl ketone, vinyl ethyl sulfone, N-methyl-N-vinyl acetamide, N-vinyl-pyrrolidone, vinyl imidazole, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic, acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like. Any of the known polymerizable monomers can be used and the compounds listed above are illustrative and not restrictive of the monomers suitable for use in this invention. Preferably, the monomer is selected from the group consisting of acrylonitrile, styrene and mixtures thereof.

The amount of ethylenically unsaturated monomer employed in the polymerization reaction is generally from 25 percent to 60 percent, preferably from 30 percent to 50 percent, based on the total weight of the product.

Illustrative polymerization initiators, generally called catalysts, although not true in the classical meaning of the term "catalyst", which may be employed are the well-known free radical types of vinyl polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, di-α-cumyl peroxide, dipropyl peroxide, diisopropyl peroxide, isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, α-methylbenzyl hydroperoxide, α-methyl-α-ethyl benzyl hydroperoxide, tetralin hydroperoxide, triphenylmethyl hydroperoxide, diphenylmethyl hydroperoxide, diisononanoyl peroxide, t-amylperoxy 2-ethylhexanoate, t-butyiperoxyisopropyl carbonate, α,α'-azobis(2-methyl butyronitrile), α,α'-azobis-(2-methyl heptonitrile), 1,1'-azo-bis(cyclohexane carbonitrile), α,α'-azobis(isobutyrate), 4,4'-azobis(4-cyanopentanoic acid), 2,2'-azobis(isobutyronitrile), 1-t-amylazo-1-cyanocyclohexane, persuccinic acid, diisopropyl peroxy dicarbonate, 2,2'-azobis(2,4-dimerhylvaleronitrile), 2-t-butylazo-2-cyanobutane and the like; a mixture of catalysts may also be used. The preferred initiators are 2,2'-azobis(isobutyronitrile), 2,2'-azobis(2,4-dimethylvaleronitrile), 2-t-butylazo-2-cyanobutane and 2,2'-azobis(2 methyl butyronitrile). Generally, from about 0.1 percent to about 5 percent, preferably from about 0.5 percent to about 2 percent, by weight of initator based on the weight of the monomer will be employed in the process of the invention.

Among those chain transfer agents which may be employed are as follows: acetic acid, bromoacetic acid, chloroacetic acid, ethyl dibromoacetate, iodoacetic acid, tribromoacetic acid, ethyl tribromoacetate, trichloroacetic acid, ethyl trichloroacetate, acetone, p-bromophenylacetonitrile, p-nitrophenylacetylene, allyl alcohol, 2,4,6-trinitroaniline, p-ethynylanisole, 2,4,6-trinitroanisole, azobenzene, benzaldehyde, p-cyanobenzaldehyde, 2-butylbenzene, bromobenzene, 1,3,5-trinitrobenzene, p-benzoquinone, benzochrysene, ethyl trinitrobenzoate, benzoin, benzonitrile, benzopyrene, tributylborane, 1,4-butanediol, 3,4-epoxy-2-methyl-1-butene, t-butyl ether, t-butyl isocyanide, 1-phenylbutyne, p-cresol, p-bromocumene, dibenzonaphthacene, p-dioxane, N,N-dimethyl aniline, pentaphenyl ethane, ethanol, 1,1-diphenylethylene, ethylene glycol, ethyl ether, fluorene, N,N-dimethylformamide, 2-heptene, 2-hexene, isobutyraldehyde, diethyl bromomalonare, bromotrichloromethane, dibromoethane, diiodomethane, naphthalene, 1-naphthol, 2-naphthol, methyl oleate, 2,4,4-triphenyl-1-pentene, 4-methyl-2-pentene, 2,6-diisopropylphenol, phenyl ether, phenylphosphine, diethylphosphine, dibutylphosphine, phosphorus trichloride, 1,1,1-tribromopropane, dialkyl phthalate, 1,2-propanediol, 3-phosphinopropionitrile, 1-propanol, pyrocatechol, pyrogallol, methyl stearate, tetraethylsilane, triethylsilane, triethylamine, tributylamine, diphenylamine, dimethylamine, dibromostilbene, α-bromostyrene, α-methylstyrene, tetraphenyl succinonitrile, 2,4,6-trinitrotoluene, p-toluidine, N,N-dimethyl-p-toluidine, α-cyano-p-tolunitrile, α,α'-dibromo-p-xylene, 2,6-xylenol, diethyl zinc, dithiodiacetic acid, ethyl dithiodiacetic acid, 4,4'-dithio-bisanthranilic acid, benzenethiol, o-ethoxybenzenethiol, 2,2'-dithiobisbenzothiazole, benzyl sulfide, 1-dodecanethiol, ethanethiol, 1-hexanethiol, 1-napthalenethiol, 2-napthalenethiol, 1-octanethiol, 1-heptanethiol, 2-octanethiol, 1-tetradecanethiol, α-toluenethiol, isopropanol, 2-butanol, carbon tetrabromide, 2-mercaptoethanol and tertiary dodecyl mercaptan, 3-mercaptopropionic acid, methyl 3-mercaptopropionate. Preferred are dodecanethiol, isopropanol, bromotrichloromethane, and 2-butanol.

The concentration of the chain transfer agent which is employed may range from about 0.5 to about 20.0 percent by weight based on the weight of monomer, preferably from about 1.0 to about 5.0 percent by weight.

The polyurethane foams employed in the present invention are generally prepared by the reaction of a graft polymer dispersion in a polyol with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane plastics are disclosed in U.S. Re. Pat. No. 24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane-diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4"-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane-diisocyanate and polymethylene polyphenylene polyisocyanate.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. The preferred or crude isocyanates are disclosed in U.S. Pat. No. 3,215,652.

As mentioned above, the graft polyols may be employed along with another polyhydroxyl-containing component commonly employed in the art. Any of the polyhydroxyl-containing components which are described above for use in the preparation of the graft polyols may be employed in the preparation of the polyurethane foams useful in the present invention.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)-ethylenediamine, N,N'-di(2-hydroxypropyl)ethylenediamine, piperazine, and 2-methylpiperazine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organo metallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface-active and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

The following examples illustrate the nature of the invention. All parts are by weight unless otherwise stated.

The following abbreviations are employed in the examples below.

Polyol A is a mixture of Polyol B and Polyol C as described below in a weight ratio of about 34:1 Polyol B:Polyol C containing from about 40 weight percent of a 1:2 acrylonitrile:styrene polymer dispersion prepared as disclosed on page 11 et seq.

Polyol B is an adduct of glycerine with propylene oxide and ethylene oxide having a hydroxyl number of 50 and an ethylene oxide content of 12.5 percent.

Polyol C is an adduct of trimethylolpropane with propylene oxide and ethylene oxide having a hydroxyl number of 26.5, an ethylene oxide content of 4.9 percent which was reacted with sufficient maleic anhydride to induce an unsaturation value of about 0.5 mole per mole of polyol. The product was then capped with ethylene oxide to reduce the acid number to less than 1.0.

Polyol D is similar to Polyol C except the hydroxyl number is 25 and the ethylene oxide content is 15 percent.

Catalyst A is Dabco TM 33Lv, a catalyst sold by M&T Corporation.

Catalyst B is stannous octoate.

Silicone A is L-6202 TM, sold by Union Carbid Corporation.

Mercaptan A is dodecanethiol.

Mercaptan B is 2-mercaptoethanol.

Thermolin 101 is supposedly tetrakis (2-chloroethyl-)ethylene diphosphate (flame retardant) sold by Olin Corporation.

TDI is toluene diisocyanate.

EXAMPLES 1-5

A reactor fitted with a stirrer, thermowell, reflux condenser, nitrogen inlet, heating means and a single stream addition tube was charged with 600 parts of Polyol A. After heating the polyol to 125° C. under a nitrogen flow, addition of a monomer stream composed of 1 part of acrylonitrile to 2 parts of styrene and a polyol-initiator stream composed of 134 parts of Polyol B to 4 parts of Polyol C to 1 part of 2,2'-azobis(2-methylbutyronitrile) initiator was begun. The monomer stream and the polyol-initiator stream feed time was 20 parts by weight per minute. The condenser was set up so that any condensed monomer was not returned to the reaction flask. The average residence time in the first reactor was 30 minutes. The product from the first reactor is pumped into a second reactor maintained at 125° C. The residence time for the product in the second reactor was about 10 minutes. The product from the second reactor was then continuously removed. Samples were collected at the indicated times and Brookfield viscosities at 25° C. were determined. These Examples indicate that in the absence of a chain transfer agent the resulting products exhibit extreme variations in viscosity as shown in Table I. Example 1 contained 1 percent by weight of dodecanethiol based on the weight of monomer and 42 percent monomer, Examples 2 and 3 with a monomer content of 40 percent did not contain a chain transfer agent. Example 4 contained 5 percent by weight of 2-butanol and 42 percent monomer, and Example 5 contained 1 percent by weight bromotrichloromethane and 42 percent monomer.

TABLE I

| Example Time/hr. | 1 Viscosity, cps/25° C. | 2* | 3* | 4 | 5 |
|---|---|---|---|---|---|
| 0.5 | 2020 | 7450 | 2730 | 2150 | 1115 |
| 1.0 | 2150 | 4480 | 4300 | 2500 | 1080 |
| 1.5 | 2230 | 4010 | 5100 | 2638 | 1030 |
| 2.0 | 2210 | 5250 | 5490 | 2500 | 975 |
| 2.5 | 2250 | 6500 | 5920 | 2400 | 1000 |
| 3.0 | 2250 | 7500 | 5660 | 2360 | 1000 |
| 3.5 | 2160 | 7350 | 6100 | 2350 | 990 |
| 4.0 | — | 5440 | 7300 | — | — |
| 4.5 | — | 4520 | 7500 | — | — |
| 5.0 | — | — | 7000 | — | — |
| 5.5 | — | — | 6750 | — | — |
| 6.0 | — | — | 6300 | — | — |

*No chain transfer agent present.

EXAMPLES 6-15

The products as listed in Table II were prepared in a manner similar to that employed for Examples 1-5.

TABLE II

| | Example | | | | | | | | | |
|---|---|---|---|---|---|---|---|---|---|---|
| | 6 | 7 | 8 | 9 | 10 | 11 | 12 | 13 | 14 | 15 |
| Polyol A, pbw | 600 | 600 | 600 | 600 | 600 | 600 | 600 | 600 | 600 | 470 |
| Polyol B, pbw | 1693 | 2031 | 1705 | 1718 | 1727 | 2565 | 2336 | 1083 | 1399 | 441.5 |
| Polyol C, pbw | 47 | 56.7 | 34.7 | 22 | 12.6 | 135 | 64 | — | — | 25 |
| Polyol D | — | — | — | — | — | — | — | 28.5 | 89.3 | — |
| Mercaptan, pbw | A, 12.6 | A, 15.1 | A, 12.6 | A, 12.6 | A, 12.6 | A, 18.0 | B, 8.0 | —* | —** | — |
| Acrylonitrile, pbw | 420 | 504 | 420 | 420 | 420 | 630 | 560 | 171 | 228 | 108 |
| Styrene, pbw | 840 | 1008 | 840 | 840 | 840 | 1170 | 1040 | 513 | 684 | 200 |

*10 pbw of isopropanol were used.
**13.7 pbw of isopropanol were used.

EXAMPLES 16-18

The polyurethane foams of Table III were prepared by charging a one quart cylindrical container with a suitable quantity of the reactants as tabulated. The mixture was stirred for about 30 seconds, allowed to set for about 15 seconds and then stirring was resumed. After about 60 seconds elapsed time, the toluenediisocyanate was added to the container, and the resulting mixture was stirred for about 4 to 5 seconds. The content of the container was then immediately poured into a cardboard cake box, and the foam was allowed to rise therein. After the foam rise was completed, the resulting foam was oven cured for about 15 minutes. The foams were tested employing the California No. 117 Flame Test as specified by the State of California Technical Information Bulletin 117, January, 1980.

TABLE III

| Example | 16 | 17 | 18 |
|---|---|---|---|

TABLE III-continued

| Formulation | | | |
|---|---|---|---|
| Polyol of Example, pbw | 100 | 100 | 100 |
| Water | 4.5 | 4.5 | 2.1 |
| Catalyst A | A, 0.25 | A, 0.25 | B, 0.25 |
| Silicone A | A, 0.9 | A, 0.9 | B, 1.0 |
| Catalyst B | C, 0.22 | C, 0.22 | D, 0.15 |
| Thermolin 101 ™ | 12 | 12 | 12 |
| TDI | 111 | 111 | 111 |

FLAME TEST RESULTS
California No. 117 Section A Part I - Open Flame Test

| | Spec. Max. | 16 | 17 | 18 |
|---|---|---|---|---|
| Afterflame, sec. | | | | |
| average | 5.0 | 2 | 0.2 | 15.4 |
| maximum | 10.0 | 9 | 2 | 23.0 |
| Char length, in. | | | | |
| average | 6.0 | 3.1 | 2.5 | 3.5 |
| maximum | 8.0 | 4.5 | 2.9 | 4.8 |

The polyols of Examples 16-18 are those of Examples 11, 12, and 15, respectively.

Theses results indicate that a graft polymer dispersion prepared in a continuous manner employing induced unsaturation levels below 0.09 mole per mole of polyol in the presence of a mercaptan when employed to prepare polyurethane foams will readily pass the California No. 117 Flame Test, while equivalent graft polymer dispersions prepared in the absence of chain transfer agents will not pass the California No. 117 Flame Test.

The embodiments of the invention in which an exclusive property or privilege is claimed are defined as follows:

1. A continuous process for the preparation of a graft polymer dispersion in a polyol comprising the in situ free radical polymerization of an ethylenically unsaturated monomer or mixture of monomers selected from the group consisting of acrylonitrile, styrene and mixtures thereof in the presence of a free radical initiator, comprising employing a polyol mixture or mixtures of (1) a polyoxyalkylene polyether polyol and (2) a polyol wherein the polyol or mixtures thereof contain from about 0.001 to 0.09 mole of induced unsaturation per mole of said polyol mixture, and wherein said free radical polymerization is conducted in the presence of an effective amount of a chain transfer agent to achieve uniform product viscosity wherein said product viscosity does not vary more than about ±15 percent at 25° C.

2. The process of claim 1 wherein the equivalent weight of the polyol is from 30 to 10,000.

3. The process of claim 1 wherein the unsaturated polyol is the reaction product of a polyoxyalkylene polyether polyol and an organic compound having both ethylenic unsaturation and a hydroxyl, carboxyl, anhydride, isocyanate or epoxy group.

4. The process of claim 1 wherein the chain transfer agent is selected from the group consisting of 1-dodecanethiol, 2-mercaptoethanol and tertiary dodecyl mercaptan, isopropanol, 2-butanol, and bromotrichloromethane.

5. The process of claim 1 wherein the concentration of the chain transfer agent is from about 0.5 to about 20 percent by weight based on the weight of monomer.

6. A polyurethane foam prepared from the reaction of the graft polymer dispersion produced by the process of claim 1 with an organic polyisocyanate in the presence of a blowing agent.

7. A polyurethane foam prepared from the reaction of the graft polymer dispersion produced by the process of claim 2 with an organic polyisocyanate in the presence of a blowing agent.

8. A polyurethane foam prepared from the reaction of the graft polymer dispersion produced by the process of claim 3 with an organic polyisocyanate in the presence of a blowing agent.

9. A polyurethane foam prepared from the reaction of the graft polymer dispersion produced by the process of claim 4 with an organic polyisocyanate in the presence of a blowing agent.

10. A polyurethane foam prepared from the reaction of the graft polymer dispersion produced by the process of claim 5 with an organic polyisocyanate in the presence of a blowing agent.

11. The process of claim 1 wherein the amount of monomer is from 30 percent to 50 percent, based on the total weight of the product.

12. A polyurethane foam prepared from the reaction of the graft polymer dispersion produced by the process of claim 11 with an organic polyisocyanate in the presence of a blowing agent.

* * * * *